United States Patent [19]

Hirukawa Koji et al.

[11] Patent Number: 4,486,381

[45] Date of Patent: Dec. 4, 1984

[54] POWER CONTROLLING APPARATUS FOR BOILING WATER ATOMIC REACTOR

[75] Inventors: Hirukawa Koji; Susumu Sumida, both of Yokohama, Japan

[73] Assignee: Tokyo Shibaura Denki Kabushiki Kaisha, Kawasaki, Japan

[21] Appl. No.: 368,436

[22] Filed: Apr. 14, 1982

[30] Foreign Application Priority Data

Apr. 17, 1981 [JP]  Japan ............................ 56-57908

[51] Int. Cl.³ .......................................... G21C 7/32
[52] U.S. Cl. ..................... 376/210; 376/216; 376/219; 364/494; 60/644.1
[58] Field of Search .............. 376/215, 216, 219, 210, 376/212; 364/492, 494; 60/644.1

[56] References Cited

U.S. PATENT DOCUMENTS 4,337,118  6/1982  Sakurai ............................ 376/216

FOREIGN PATENT DOCUMENTS

5344793  10/1976  Japan .
5436480   8/1977  Japan .
5439788   9/1977  Japan .

Primary Examiner—Donald P. Walsh
Attorney, Agent, or Firm—Oblon, Fisher, Spivak, McClelland & Maier

[57] ABSTRACT

A power control apparatus of a boiling water atomic reactor for transferring the atomic reactor to a low power stand-by operation when a load of a generator is rejected. The necessity of insertion of control rods into a core is decided in accordance with the state of the atomic reactor when a load rejection occurs. When the insertion of control rods is required selected control rods are inserted into the core and a core flow rate is reduced to transfer the atomic reactor to the low power stand-by operation. When the insertion of control rods is not necessary only the reduction of core flow rate is performed.

5 Claims, 9 Drawing Figures

POWER CONTROLLING APPARATUS FOR BOILING WATER ATOMIC REACTOR

BACKGROUND OF THE INVENTION

The present invention relates to a power controlling apparatus for transferring a boiling water atomic reactor to a low power stand-by operation when a trouble to lower the power of the atomic reactor, e.g., a load rejection, a turbine trip or the like occurs in or out of a boiling water atomic power plant.

When the load of a generator is rejected due to a trouble of a power transmission system, for example, in a boiling water atomic power generating facility, a main steam control valve is closed to limit the supply of the steam to a turbine so that the overrun of the turbine is prevented, a turbine bypass valve is opened to release excessive steam to a condenser, and a scram signal is outputted to scram the atomic reactor. The trouble in the power transmission system can be frequently repaired in a relatively short time. If the atomic reactor is, however, once scrammed, complicated procedure is necessary to restart the operation of the atomic reactor thereafter, and it takes a plenty of time. Accordingly, the trouble causes drawbacks and disadvantages of lowering the operating efficiency of the atomic power plant. In order to heretofore prevent such drawbacks and disadvantages, the atomic reactor is not scrammed, when a trouble to lower the power of a generator, e.g., the rejection of the load of the generator, or the like occurs, but is transferred to the stand-by operation with low power so as to readily and rapidly restart the normal power operation of the atomic reactor immediately after the trouble to lower the power is removed, thereby improving the operating efficiency of the atomic power plant. In order to transfer the atomic reactor to the low power stand-by operation, a recirculation pump for the atomic reactor is first transferred to the minimual flow rate operation to reduce the core flow rate, a turbine bypass valve is simultaneously opened to release excessive steam to a condenser. Accordingly, the void fraction in the core is abruptly increased, and the power of the atomic reactor is thus lowered to a low power operation. In as much as a boiling water atomic power plant usually employs extracted steam from the turbine as a heat source for heating feed water, if the turbine bypass valve is opened and the atomic reactor is thus transferred to the low power operation, the extracted steam cannot be sufficiently obtained from the turbine, resulting in that the feed water heating capacity will decrease or be lost. Thus, the temperature of the feed water is lowered to decrease the void friction in the reactor core and accordingly the thermal output of the core which is once lowered due to the transfer of the recirculation pump to the minimum flow rate operation will increase, as shown by a curve A in FIG. 1, as the time is elapsed, and will hence reach higher power level than the reference level capable of maintaining stable power with low core flow rate with the result that the core stability is disadvantageously poor, or the atomic reactor reaches the scram level in the low flow rate range, causing the scram of the reactor.

For that purpose, parts of control rods selected in advance, (selected control rods), are quickly inserted, when the recirculation pump for the atomic reactor is transferred to the minimum flow rate operation.

Figure 1:
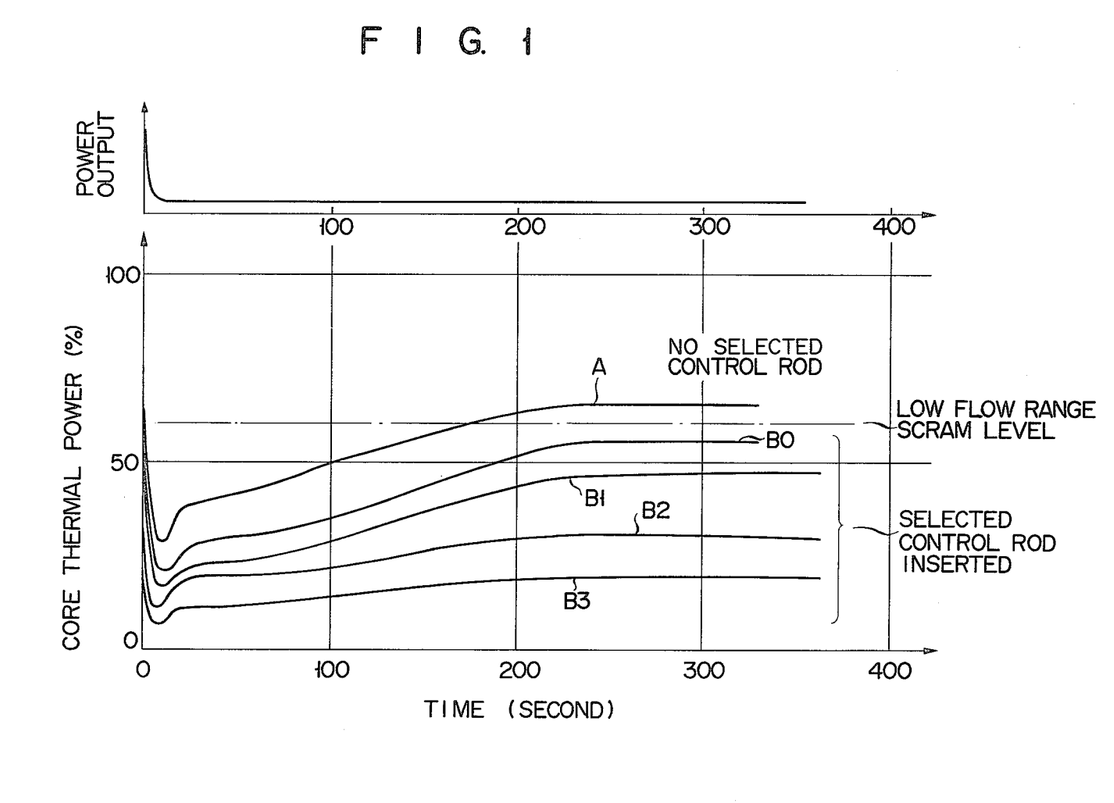
FIG. 1 is a graph showing the ageing variation of the thermal power of the core of an atomic reactor and the output power of a generator when a load of the generator is rejected and the recirculation for the atomic reactor is operated in the minimum flow rate.

Thus, the increase of the thermal power of the core can be suppressed, as shown by curves B1 to B4 in FIG. 1, by insertion of the selected control rods to maintain the atomic reactor in low power stand-by operation state. In this case, the selected control rods are selected which are arranged in a pattern which is most preferred to restart the normal power operation and to raise the power thereafter. Conventionally, when a trouble to lower the power of the atomic reactor, e.g., the load rejection of the generator or the like heretofore occurred, the recirculation pump for the atomic reactor was automatically transferred to the minimum flow rate operation and all the selected control rods where simultaneously abruptly inserted. When the atomic reactor is thus transferred to the low power stand-by operation, the power of the atomic reactor is feasibly affected by an operating state before the load of the generator is rejected. If the atomic reactor operated in high power state is, for example, transferred, as described above, to the partial power operation, its settled power becomes relatively high. If the atomic reactor operated in low power state is transferred under the same condition as above to the low power standby operation, its settled power becomes relatively low. FIG. 1 shows examples of calculated results. The curves $B_0$ to $B_3$ represent the thermal power variations of core with time when load is rejected in the initial conditions of 100, 80 and 60% rated operation of the thermal output at the 100% rated flow rate and the selected control rods of the same amount are inserted.

When the load of the generator is heretofore rejected and the atomic reactor is thus transferred to the low power stand-by operation in this manner, it was difficult to transfer the power of the atomic reactor to a desired or predetermined power level, and if the thermal power of the atomic reactor transferred to the low power stand-by operation is high, its stability is poor. Since the necessary number of partially inserted control rods delicately vary according to the state of core, it is also difficult to countermeasure against this variation in advance.

When an atomic power generating system is operated with low power to gain a source for station house load necessary for an isolated grid operation, it is preferred to set the output power of generator to approximately 10% of the rated output power. If the selected control rods are set so as to maintain stably the low power stand-by operation even when a load rejection occurs in case where the atomic reactor is normally operated at the highest level, the power of the atomic reactor is excessively lowered after the atomic reactor is transferred to the low power stand-by operation in case where such a trouble occurs when the atomic reactor is normally operated at relatively low power. This might cause the failure of obtaining the output power of the generator for a isolated grid operation. When a cause of load rejection is removed, the atomic reactor power is increased to restart a normal operation of atomic reactor. Various control rod operations are so effected as to prevent a local power increase of the core and to secure the quality of fuel during the increase in the reactor power. If the power of the atomic reactor is excessively lowered in this case as described above, the operations of the control rods during the increase of the power of the atomic reactor becomes frequent and simultaneously the operation state will enter into a control range of the control rod operation sequence controller provided for safety. Thus, the operations of control rods are restricted. This takes a long time to transfer the reactor to its normal operation as its drawbacks.

SUMMARY OF THE INVENTION

It is an object of the present invention to provide a power controlling apparatus for a boiling water atomic reactor, which can stably and accurately control the power of the atomic reactor after transfer to a low power stand-by operation if a trouble to lower the power of the atomic reactor, e.g., the load rejection of a generator occurs, can prevent the excessive decrease of the power of the atomic reactor and can simplify the operation of control rods for restarting the normal operation thereafter.

DETAILED DESCRIPTION OF THE PREFERRED EMBODIMENT

An embodiment of the present invention will be described in more detail with respect to a case where a load of a generator is rejected with reference to FIGS. 2 through 7.

Figure 2:
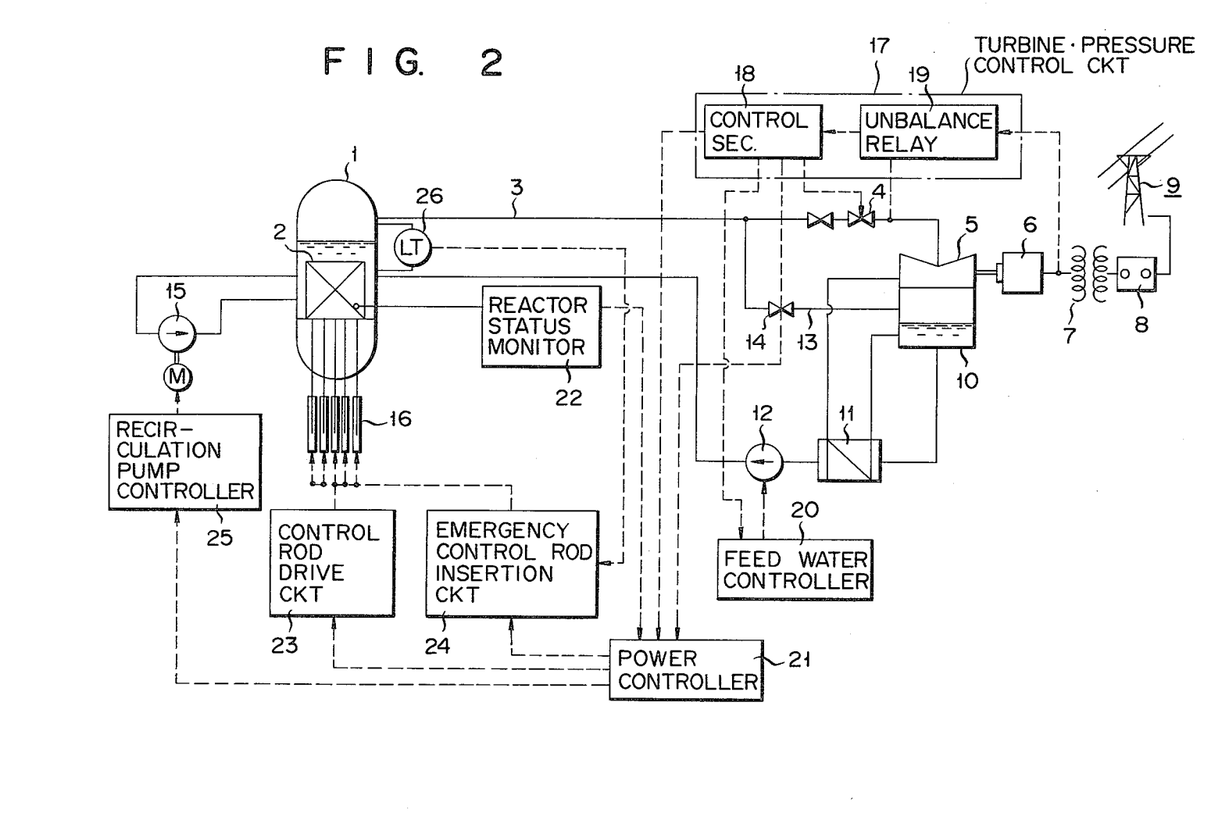
FIG. 2 is a block diagram showing one preferred embodiment of the power control apparatus for the boiling water atomic reactor according to the present invention.

A pressure vessel of an atomic reactor is generally designated by reference numeral 1. In pressure vessel 1 is contained a core 2. The steam generated in core 2 is fed through a main steam pipe 3 and a main steam control valve 4 to a turbine 5. A generator 6 is driven by turbine 5 to generate electric power, which is fed through a main transformer 7 and a main breaker 8 to a transmission network 9. The steam which drived turbine 5 is introduced to a condenser 10, and is thereby condensed into condensate. This condensate is fed as feed water by a condensate pump (not shown) to a feed heater 11 where it is heated. The heater 11 utilizes the extracted steam from turbine 5 as a heat source. The extracted steam exchanges heat with the feed water and is condensed to drain water, which is in turn returned to condenser 10. The feed water thus heated by heater 11 is fed by a feed water pump 12 to pressure vessel 1 of atomic reactor. A turbine bypass pipe 13 is branched from an intermediate portion of main steam pipe 3, and is connected with condenser 10. A turbine bypass valve 14 is provided at an intermediate portion of bypass pipe 13, and is opened to release the main steam to condenser 10 bypassing turbine 5. A recirculation pump of atomic reactor is des-gnated by reference numeral 15, and is constructed to recirculate coolant in pressure vessel 1 through core 2. Reference numeral 16 designates control rod driving mechanisms, which serve to insert or withdraw control rods (not shown) in core 2, and is constructed to control the reactivity of core 2. Reference numeral 17 designates a turbine and pressure control circuit, and serves to control the pressure or of the main steam or the rotating speed of turbine 5. The turbine and pressure control circuit 17 has a controller 18 and an unbalance relay 19. An output signal of generator 6 is applied to unbalance relay 19, which is constructed to detect the load rejection such as a trouble of transmission network 9. A load rejection detect signal produced by unbalance relay 19 is applied to controller 18. When receiving the load rejection detect signal, controller 18 feeds a signal to main steam control valve 4 and turbine bypass valve 14, so that valve 4 is quickly closed to prevent the overrun of turbine 5, and bypass valve 14 is quickly opened to release the eccessive steam to condenser 10. The controller 18 feeds a signal to a feed water pump control circuit 20 which thus controls the flow rate of feed water by stoping a part of feed water pumps 12 corresponding to the low power stand-by operation of the atomic reactor as will be hereinafter described. A signal from controller 18 is also applied to an power control circuit 21. The power control circuit 21 is applied a valve open signal from turbine bypass valve 14. Reference numeral 22 designates an atomic reactor status monitoring system, which feeds atomic reactor status signals corresponding to the power of core 2 or other states of the atomic reactor to power control circuit 21. Power control circuit 21 feeds signals to a selected control rod inserting circuit (SRI CKT) 23, an emergency control rod insertion circuit 24 and a recirculation pump control circuit 25, respectively to control rod driving mechanisms 16 and atomic reactor recirculation pump 15, and is constructed to transfer the atomic reactor to the low power stand-by operation when a load rejection occurs.

Figure 5:
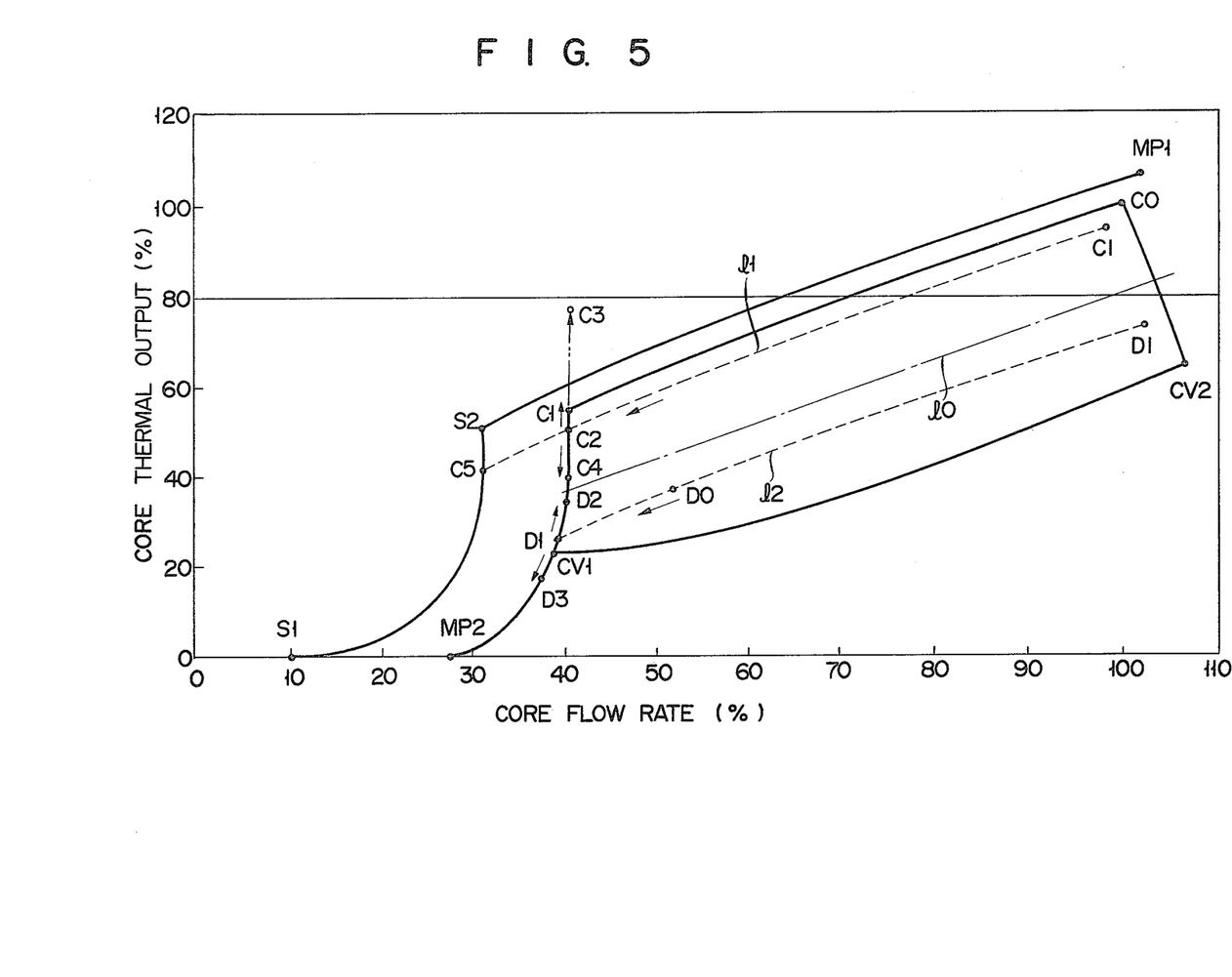
FIGS. 5 and 7 are graphs showing the characteristic maps of the operation of the atomic reactor for the explanatory purpose of the operation of the power control apparatus according to the present invention.

Water level in pressure vessel 1 is measured by a reactor water level sensor 26 which feeds a signal to emergency control rod insertion circuit 24. More particularly, power control circuit 21 receives the atomic reactor status signals from atomic reactor status monitoring system 22 and always calculates the value of "b" represented by following equation (1) from the thermal power $P_0$ of the core and the core flow rate (or the rotating speed of atomic reactor recirculation pump 15) $W_0$ of the atomic reactor status signals during an ordinary operation of atomic reactor:

$$b = P_0 - aW_0 \qquad (1)$$

where "a" represents a constant, which is a value corresponding to a ratio of a change in the core flow rate to a change in the thermal power of core. For instance, this constant corresponds to gradients of flow control line, e.g., $S_2$ MP1, $C_1$ to $C_0$ operation characteristics map shown in FIG. 5. Power control circuit 21 feeds a control signal according to a combination of the value of "b" calculated by equation (1) and the value of $P_0$ to recirculation pump control circuit 25 and SRI circuit 23 when load rejection occurs. Thereafter, power control circuit 21 also feeds a signal to emergency control rod insertion circuit 24 as required by referencing the bypass valve open signal from turbine bypass valve 14.

Figure 3A:
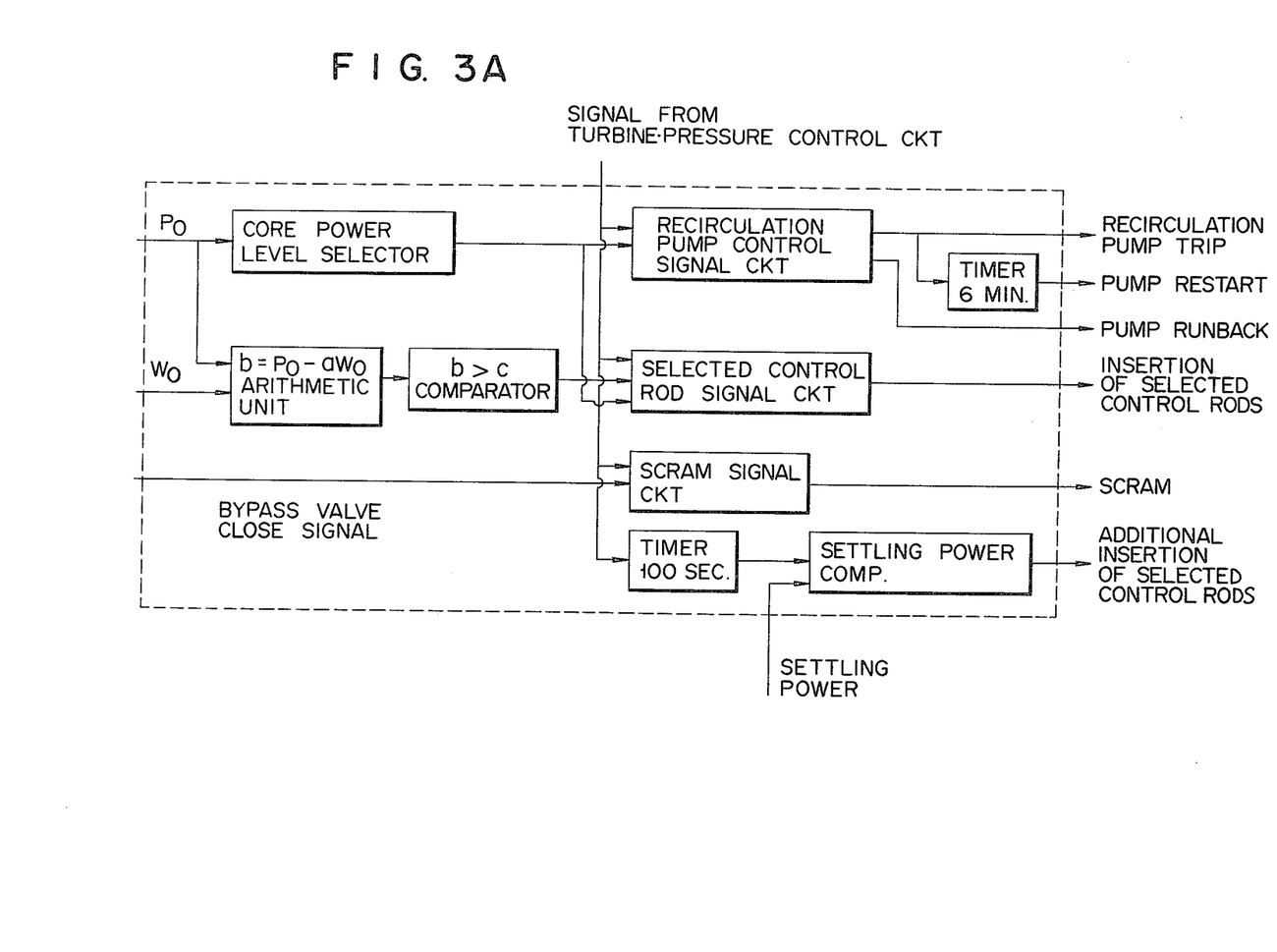
FIGS. 3a and 3b are block diagrams showing the examples of the arrangements in the power control apparatus according to the present invention.

An embodiment of power control circuit 21 will be described with reference to FIG. 3a.

The power control circuit 21 needs a trip signal to recirculation pump control circuit 25 of the atomic reactor in case where the core thermal power $P_0$ is higher than a preset level, e.g., higher than 80% of a rated power when a load rejection occurs. The power control circuit 21 will feed an operation signal to SRI circuit 23 when the value of "b" in equation (1) is higher than a preset value "c". Due to these signals recirculation pump 15 of atomic reactor trips so that selected control rods are inserted into core 2, thereby lowering the thermal power of core. Slightly later, when power control circuit 21 receives a valve opening signal from turbine bypass valve 14, it actuates a timer and after a preset time, e.g. 6 minutes, feeds a signal to recirculation pump control circuit 25 which outputs a minimum flow rate operation start signal to recirculation pump 15. If power control circuit 21 does not receive the valve opening signal from turbine bypass valve 14 at this time, it will output a scram signal to emergency control rod insertion circuit 24. Thus, the selected control rods are inserted into the core, and then all the control rods are rapidly inserted into the core, thereby shutting down the atomic reactor.

In case where the core thermal power $P_0$ at the time of load rejection is at a middle level, e.g., within a range of 20 to 80% of the rated power, power control circuit 21 will feed a run-back signal to recirculation pump control circuit 25, to set recirculation pump 15 in the minimum flow rate operation, thereby limiting the core flow rate to a low value and lowering the core power. Simultaneously, power control circuit 21 will feed an operation signal to SRI circuit 23 when the value of "b" in equation (1) is larger than the preset value "c". The control circuit 21 will allow only the runback of recirculation pump 15 if the value of "b" is less than the prescribed value "c". In response to the operation signal, the preset selected control rods are inserted into core 2, thereby lowering the reactivity of core 2 and thus decreasing the thermal power thereof. The power control circuit 21 then confirms the valve opening signal from turbine bypass valve 14 and issues a scram signal, in the absence of the valve opening signal, to emergency control rod insertion circuit 24 so that the selected control rods and then all the control rods are inserted into core, thereby shutting down the atomic reactor.

In case where the thermal power $P_0$ of core at a time of load rejection is low, e.g., less than 20% of the rated power, power control circuit 21 does not perform the transfer of recirculation pump 15 to the minimum flow rate operation nor carry out the insertion of the selected control rods, but allows turbine pressure control circuit 17 to open turbine bypass valve 14, thereby releasing the excessive steam to condenser 10. Main steam control valve 4 is temporarily closed when the load rejection occurs so as to prevent the overrun of turbine 5. After the reactor has been transferred to the low power stand-by operation, main steam control valve 4 is opened by turbine pressure control circuit 17 so that generator 6 is operated at a low output power level (about 10% of rated output power) as a station house load source.

When the load is rejected, turbine and pressure control circuit 17 feeds a signal to feed water pump control circuit 20 so as to control the water level in the core by tripping one of feed water pumps 12. When the water level in pressure vessel 1 is, for example, lowered to a lower limit level, reactor water level sensor 26 will detect it and feeds a water level low signal to emergency control rod insertion circuit 24. Thus, all the control rods are urgently inserted into core 2, thereby shutting down the atomic reactor and securing the safety of the reactor.

Figure 4:
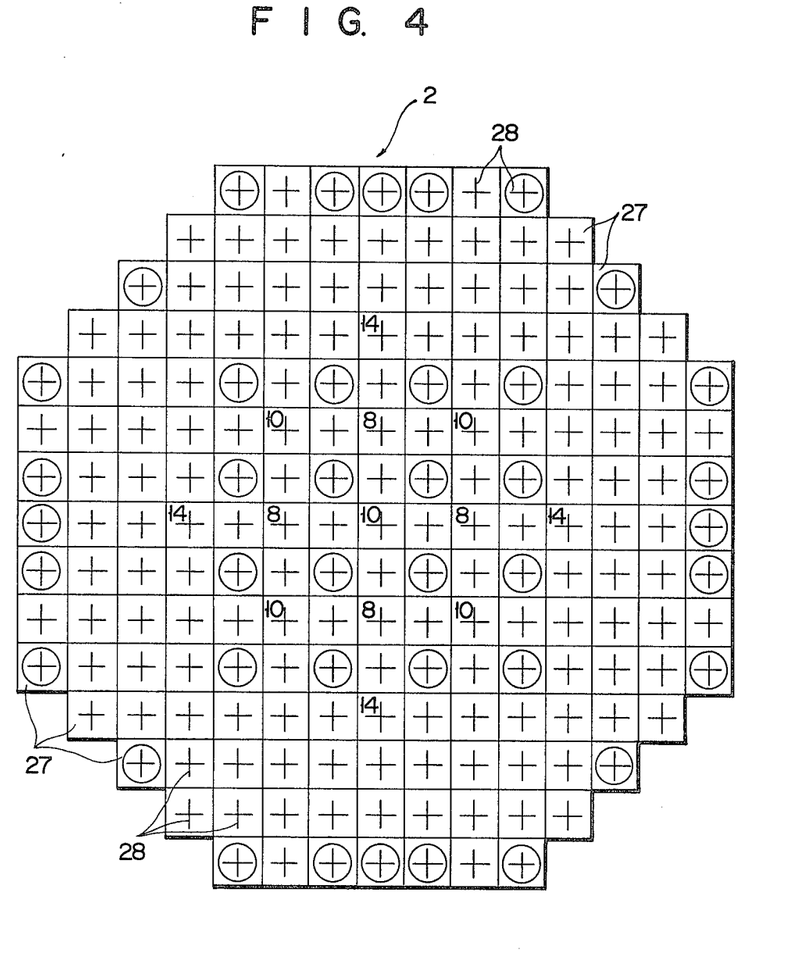
FIGS. 4, 6 and 8 are schematic views of the core showing the examples of the arrangement pattern of selected control rods in the embodiment of the present invention.
Figure 6:
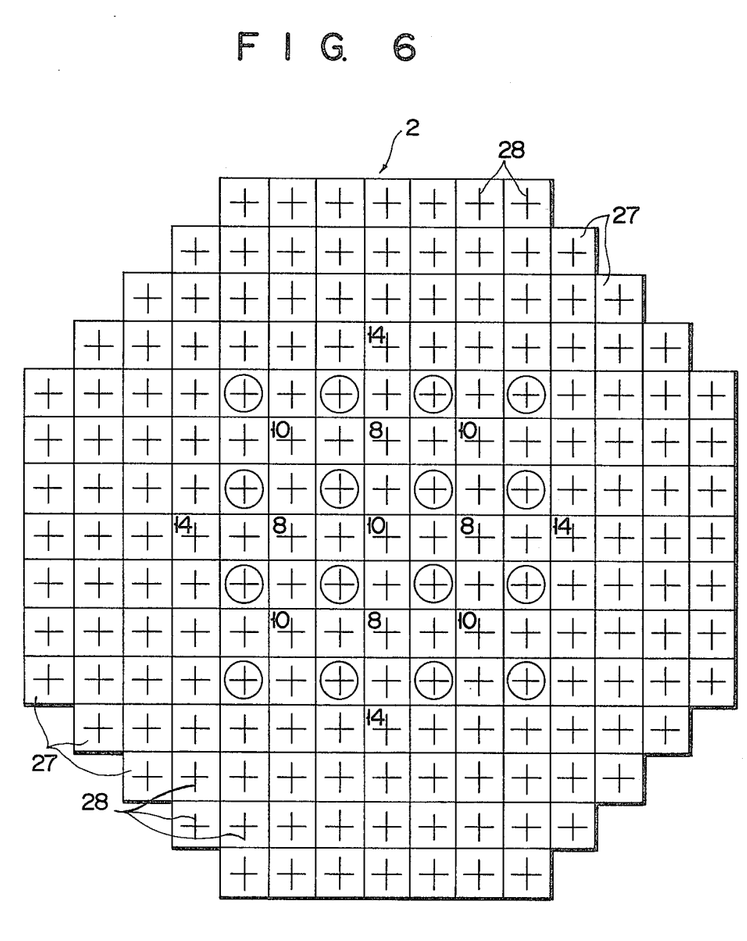
Figure 7:
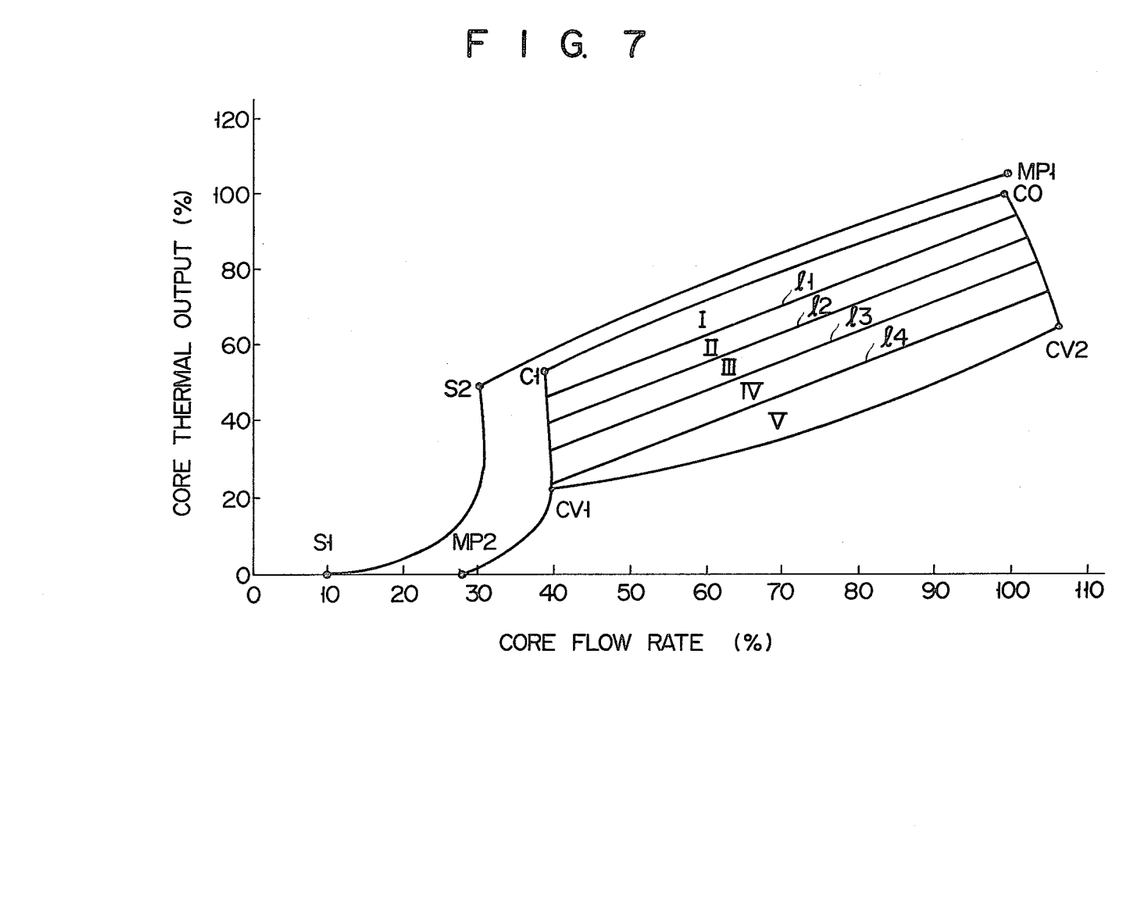

The selected control rods are arranged in such a preselected pattern as to effect most easily the operation of control rods for maintaining the low power stand-by operation and raising the power after the normal power operation is restarted, and carry out the transference to the normal power operation most quickly. An example of such a pattern is shown in FIG. 4. In FIGS. 4, 6 and 7, reference numeral 27 designates unit lattice, 28 designates control rods, and control rods surrounded by circles are the selected control rods. The selected control rods 28 arranged in the pattern shown in FIG. 4 need not be simultaneously inserted into core 2. Namely, selected control rods arranged in a pattern shown in FIG. 6 may be first inserted into core 2. After the selected control rods in the pattern shown in FIG. 6 are inserted into the core, the variation in the thermal power of the core is monitored in accordance with a signal from atomic reactor status monitoring system 22 and the residual selected control rods are further inserted into the core, when the thermal power of the core is not lowered to a preset value, e.g., when the thermal output is not lowered to less than 50% after 100 seconds has elapsed. In this case, by measuring a inserting time until the first selected control rods are inserted to a predetermined position of the core, when the inserting time is longer than a preset time, additional selected control rods may be inserted into the core. It is noted that the patterns of the additional selected control rods are predetermined in accordance with a variety of cases and information of these patterns are inputted in advance to SRI circuit 23.

According to the above-mentioned embodiment of the present invention, when the load rejection of generator 6 occurs and the atomic reactor is transferred to the low power stand-by operation, the operation for transferring the reactor to the low power operation can be suitably selected by power control circuit 21. Accordingly the smooth transfer of the atomic reactor to the low power stand-by operation can be performed and the power of the reactor after the transfer can also be accurately controlled. Since the smooth and stable transfer of the atomic reactor to the partial power operation can be thus carried out, generator 6 may be operated at a low output power, e.g., approx. 10% of the rated output power so as to supply electric power as required in the power plant. The reasonable operation of such cases will be described.

FIG. 5 shows an operation characteristic map of a boiling water atomic reactor. The curves $S_1$ to $S_2$ in FIG. 5 exhibit a relationship between the core flow rate and the thermal power of the core in the case where the recirculation pump of the atomic reactor is not operated but the coolant is circulated merely by means of natural convention. The curve $S_2$ to $MP_1$ is a flow rate control curve which indicates the relationship between the core flow rate and the thermal power of the core in the case where the reactivity of the core is so regulated as for the thermal power to become 105% when the core flow rate is set to 100% and. The reactor is normally operated in the range below this flow rate control line $S_2$ to $MP_1$. It is noted that since the blades or impeller of the recirculation pump of the atomic reactor might be damaged due to the thermal stress if the reactor is retained in the state that the recirculation pump is stopped from the state that the reactor is operated, the recirculation pump is ordinarily not stopped but is operated at the minimum flow rate. The curve $MP_2$ to $C_1$ in FIG. 5 denotes the relationship between the core flow rate and the thermal power of the core when the recirculation pump of the atomic reactor is operated at the minimum flow rate. The curve $C_1$ to $C_0$ in FIG. 5 shows a flow control line exhibiting the relationship between the core flow rate and the thermal power of the core in the case where the reactivity of the core is so regulated as for the thermal power to become 100% when the core flow rate is set to 100%. The curve $CV_1$ to $CV_2$ depicts a cavitation line, and when the atomic reactor is operated in the range below the cavitation line, cavitation of a jet pump will occur.

Accordingly, the atomic reactor is normally operated in the range between flow control line $S_2$ to $MP_1$ and cavitation line $CV_1$ to $CV_2$. When the load is rejected while the atomic reactor is operated under the condition of point $C_I$ in FIG. 5 for instance and recirculation pump 15 is transferred to the minimum flow rate operation, the power of the reactor is lowered along curve $l_1$ substantially parallel to flow control line $S_2$ to $MP_1$ and $C_1$ to $C_0$ and eventually reaches an intersection $C_2$ with curve $MP_2$ to $C_1$. Since the extracted steam cannot be obtained from turbine 5 as described above, the heating of feed water is failed, and the inlet enthalpy of the atomic reactor core is lowered with the result that the void fraction of core 2 is lowered and the thermal power temporarily lowered as shown in FIG. 1 increases. In this case, the increase of the thermal power of the core will follow up curve $MP_2$ to $C_1$ from point $C_2$ and its extension, and might in some cases reach a range, as shown by point $C_3$, above flow control line $S_2$ to $MP_1$ which is the operation limiting curve. In case where the atomic reactor is operated at point $D_I$ in FIG. 5, the thermal power of core is lowered, along curve $l_2$ substantially parallel to flow control line $S_2$ to $MP_1$, to intersection $D_1$ with curve $MP_2$ to $C_1$, and thereafter raised along curve $MP_2$ to $C_1$, reaching to point $D_2$. In case where the selected control rods are inserted and recirculation pump 15 is transferred to the minimum flow rate operation, the thermal power of core is, contrary to the above, lowered from points $C_2$ and $D_1$ along curve $MP_2$ to $C_1$ and eventually reaches points $C_4$ and $D_3$, respectively. Accordingly, in case where the atomic reactor is operated under different conditions as designated at points $C_I$ and $D_I$, when only recirculation pump 15 is transferred to the minimum flow rate operation, between the thermal power of core after transferred to the minimum flow rate operation there occurs a large difference as denoted by points $C_3$ and $D_2$. Even when recirculation pump 15 is transferred to the minimum flow rate operation and the selected control rods are inserted into core, between the thermal power of the core after transferred to the low power operation there also occurs a large difference as depicted by points $C_4$ and $D_3$. Thus, with conventional arrangements of the atomic reactor there occurs a large difference between thermal power of core after transferred to the low power operation, and consequently stable control cannot be performed.

On the other hand, according to the power control apparatus of the present invention, the value of "b" represented by $$b = P_0 - aW_0 \quad (1)$$

is calculated from thermal power $P_0$ and core flow rate $W_0$ when the load is rejected, and whether selected control rods are inserted or not is determined by the value of "b". In the case of b=c, since a is substantially equal to the gradient of curve $S_2$ to $MP_1$, a straight line represented by $$b = c = P_0 - aW_0 \quad (2)$$

corresponds to a straight line $l_0$ substantially parallel to curve $S_2$ to $MP_1$ as shown in FIG. 5. Accordingly, in the case of b≧c i.e., in case where the atomic reactor is operated in the range above the line $l_0$ as denoted by point $C_1$, the selected control rods are inserted into the core with the result that the thermal power of core after transferred to the low power operation is lowered from point $C_2$ to point $C_4$ along curve $MP_2$ to $C_1$.

In the case of b<c i.e., in case that the atomic reactor is operated in the range below the line $l_0$ as designated by point $D_1$, the selected control rods are not inserted with the result that the thermal power of core after transferred to the low output operation is raised from point $D_1$ to point $D_2$ along curve $MP_2$ to $C_1$. Accordingly, even if there is a large difference in the operating state of the atomic reactor before load rejection occurs, the thermal power of core eventually converges into a narrow range as defined by points $C_4$ and $D_2$ in FIG. 5 after the reactor is transferred to the low power operation. Therefore, the thermal power of core after transferred to the low power operation can be accurately and stably controlled in this manner. With this system, when the load is rejected the reactor is not scrammed, and is merely transferred to the low power operation. Accordingly, there is a possibility of fuel damage due to the face that, if turbine bypass valve 14 does not accidentally opened, the pressure in pressure vessel 1 will abruptly increase until the atomic reactor is scrammed. However, according to the present invention, since if the thermal power of core is relatively high, e.g., higher than 80% of the rated power at the time of load rejection, recirculation pump 15 is once stopped and is then operated at the minimum flow rate after the opening of turbine bypass valve 14 is confirmed, the thermal power of reactor is lowered to point $C_5$ in FIG. 5 while recirculation pump 15 is stopped. Thus, even if the pressure in pressure vessel 1 abruptly increases until the atomic reactor is scrammed, since circulation pump is tripped the fuel is not affected. It is noted that, if the thermal power of core is less than 80% of the rated power when the load rejection occurs, it is not necessary to stop recirculation pump 15. Since the thermal power of core need not be lowered when the thermal power of core is low, e.g., less than 20% of the rated power, the excessive steam may be released to condenser 10 by opening turbine bypass valve 14, and the atomic reactor may be continued in operation.

With a modification of the present invention, since a part of the selected control rods is inserted into core, and the other selected control rods are inserted into core when the thermal power of core is not so lowered as predetermined, the power of atomic reactor can be accurately and stably controlled after the reactor is transferred to the low power operation. That is, as described above, there occurs a difference in the thermal power of core after transferred to the low power operation according to the state of the atomic reactor, e.g., the reactivity of the core when the load is rejected.

Accordingly the selected control rods to be inserted are so selected that the thermal power of core becomes lower than a prescribed allowable power even when the power becomes maximum after the reactor is transferred to the low power operation. Therefore, when all the selected control rods are simultaneously inserted into the core, the thermal power of core is excessively lowered in case where the thermal power of core is relatively low when the load is rejected, preventing accurate and stably control of core power. When the load rejection is recovered, the normal power operation of reactor is restarted. It is necessary, in this case, to operate control rods in various ways for the purpose of preventing a local power rise and maintaining the fuel integrity. If the thermal power of the core is excessively lowered, the operation of control rods becomes complicated. However, in the embodiment, it is so constructed that the selected control rods are partly retained initially, and the residual selected control rods are inserted only when the power is not lowered as predetermined while monitoring the thermal power of core. Accordingly, since the selected control rods are inserted into core in the quantity necessary at the minimum, the thermal power of the core does not excessively decrease, but can be accurately and stably controlled, and the operation of the control rods for restarting the normal power operation becomes simple. It is noted in this case that since the minimum number of the selected control rods is inserted into the core, if part of the selected control rods is not normally inserted into the core, there disadvantageously occurs the excessive rise of the thermal power of core. However, since this embodiment is constructed to monitor a predetermined inserting time of the selected control rods, to decide, if it takes longer than the predetermined normal inserting time, as that normal insertion of the selected control rods is not performed, and to insert additional control rods corresponding to the number of the control rods not inserted, it can prevent the rise of the excessive thermal power of the core, thereby increasing reliability. Further, since the rise of thermal power of core thus once lowered is, relatively slow as shown in FIG. 1, when the load is rejected and the recirculation pump 15 is stopped or is transferred to the minimum flow rate operation, the fuel is not affected even if the selected control rods are inserted into the core at several times as described above.

The present invention is not limited to the particular embodiment described above. For example, in the embodiment described above, the decision of whether the selected control rods are inserted into the core or not is not limited only to the case of the above embodiment, but after the core flow rate decreases the power of core may be calculated from the atomic reactor status signals, and the decision of whether the selected control rods are inserted into the core or not may be performed on the basis of the calculated result.

Another embodiment of the power control apparatus will now be described with reference to FIGS. 1, 3b, and 5 through 7.

By comparing curves $B_0$ to $B_3$, it is understood that, when the number of inserted control rods is identical, the settling power of the atomic reactor greatly differ depending upon initial states. It is necessary to set the power of core to approx. minimum 10% of the rated operation so as to obtain a power source in the power plant itself when the atomic reactor is operated at the low power stand-by operation.

On the other hand, when the power of the core is excessively increased when the atomic reactor is operated at the low power stand-by operation, the stability of the core is poor, and the condenser cannot perform the bypass steam treating function. It is further desired to maintain the settling power of the atomic reactor at high level, e.g., approx. 50% of the rated operation so as to shorten and smoothen a time and an operation to recover the reactor from the partial power operation state to the initial state.

The second embodiment of the power control apparatus is different from the first embodiment at the following points.

Figure 3B:
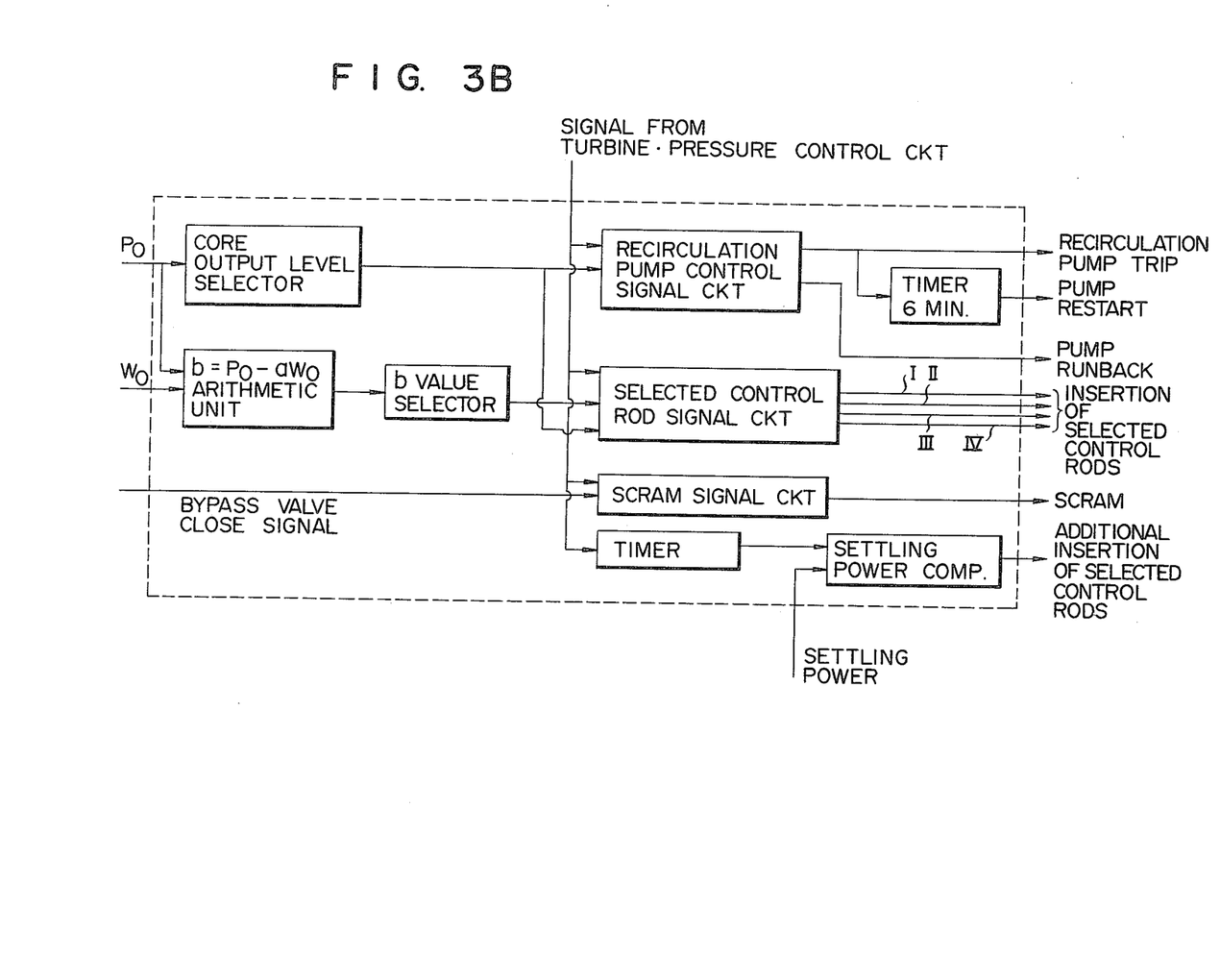

Power control circuit 21 is so constructed as to receive atomic reactor present status signals from atomic reactor status monitoring circuit 22, to always calculate the value of "b" represented by $$b = P_0 - aW_0$$

from a thermal power $P_0$ of the core and a core flow rate $W_0$ in the atomic reactor status signals during the normal operation, to output selected control rod inserting signals to SRI circuit 23 in accordance with the value of b when b>c and to lower the output of the reactor by abrupt insertion into core 2 of the selected control rods of the number set in accordance with a control rod inserting signal. The other part and arrangements of the second embodiment are the same manner as those of the first embodiment.

When the number of the selected control rods to be inserted into the core is constant irrespective of the initial state, following drawback and disadvantage will occur. For example, in case where initial state is at point $D_0$ when the selected control rods of the same number as in the case that the initial is at point $C_0$ are inserted into the core, the thermal power of the core reaches point $D_1$ from point $D_0$ along a flow control line $l_2$ substantially parallel to curve $C_0$ to $C_1$, and further arrives at point $D_3$ under the allowable operation range due to the fact that the thermal power of the reactor is further lowered. Since the steam output is smaller than the thermal power at such power level, the atomic reactor cannot supply sufficient electric power necessary in the power plant, i.e., the steam flow rate of 10% of the rated operation cannot be obtained, and hence the power of the atomic reactor cannot be expected to be recovered to the original level. Thus, it is necessary to differentiate the number of selected control rods to be inserted into the core in accordance with the initial state and to perform the partial power operation in accordance with the power level suitable for the recovery of the power of the atomic reactor.

Accordingly, the power control circuit 21 will decide the necessity of inserting the selected control rods and the number of control rods to be inserted into the core as below.

The thermal power $P_0$ of the core at the initial state of the atomic reactor and the core flow rate (or the rotating speed of recirculation pump 15) $W_0$ are inputted to power control circuit 21 as the atomic reactor present status signals, and the value of b is calculated which is represented by $$b = P_0 - aW_0$$

where a represents a constant, which corresponds to the gradient of flow control line $MP_1$ to $S_2$ and $C_0$ to $C_1$ in FIG. 5. Then, a predetermined value c is set using the value of b in view of the increase of the thermal power of the core with decrease of the inlet temperature of the core after recirculation pump 15 is run back, and in the case of b≦c the insertion of the selected control rods is not performed, but recirculation pump 15 is run back to transfer the reactor to the minimum flow rate operation. In the case of b>c an recirculation pump 15 is transferred to the minimum flow rate operation, the selected control rods are then inserted, the number of which is stepwisely increased in accordance with the value of b. The classification of the number of the selected control rods is exemplified on the characteristic map of the operation of the atomic reactor in FIG. 7. More particularly, the allowable atomic reactor operation range between flow control line $C_0$ to $C_1$ and cavitation line $CV_1$ to $CV_2$ is divided into five regions "I" to "V" by flow control line $l_1$, $l_2$, $l_3$, $l_4$ substantially parallel to flow control line $C_0$ to $C_1$, the number of the selected control rods to be inserted into core is set at 16 when the initial state is located in the region "I", and the numbers of the selected control rods to be inserted are sequentially set at 12, 8, 4 and 0 for regions "II", "III", "IV" and "V" respectively. The classification of the number of the selected control rods to be inserted into the core may not always limited only to the case shown in FIG. 7, but may be, for example, reduced in the number of the classification of the selected control rods to be inserted into the core in case where the power of the atomic reactor is controlled in the range between 50% and 10% of the rated power when the turbine bypass valve is abruptly opened.

Further, the number of the selected control rods to be inserted into the core may be not only differentiated but varied in the inserting sequence of the selected control rods, or differentiated in the quantity of the insertion of the control rods into the core. In addition, the disposition or arrangement of the selected control rods may also be suitably set. For instance, patterns of the arrangements of the selected control rods to be inserted are exemplified in FIGS. 6 and 8.

Figure 8:
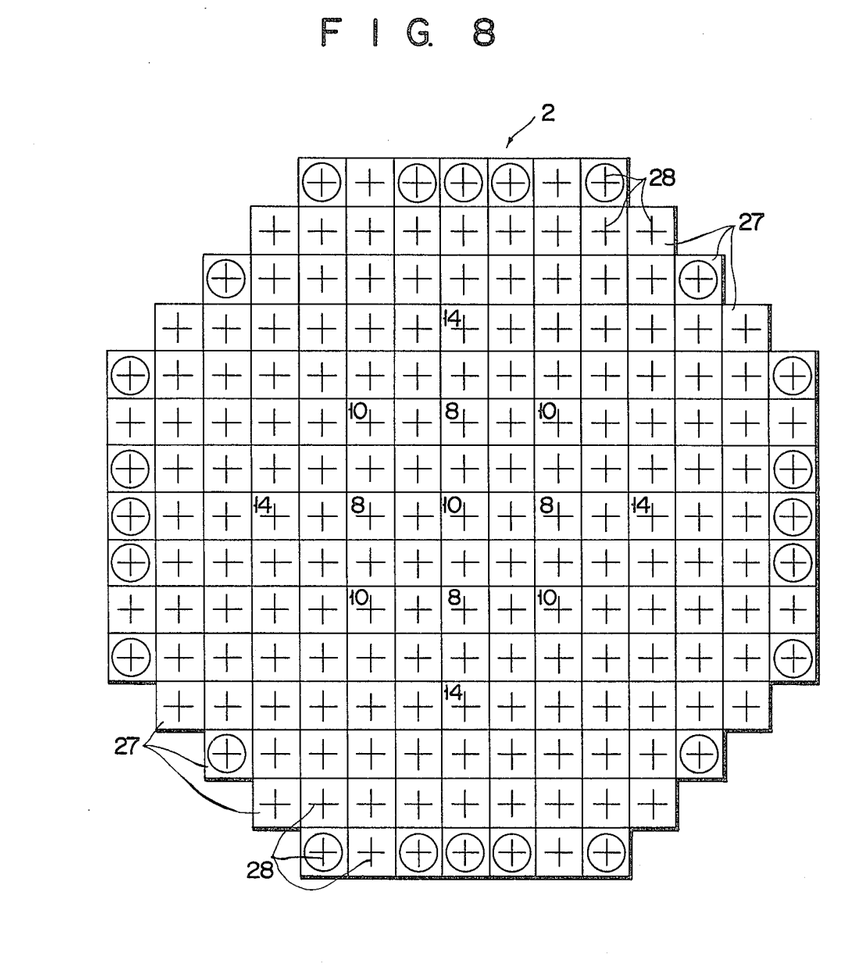

In FIGS. 6 and 8, reference numeral 27 designates a unit lattice, 28 illustrates control rods, and control rods surrounded by circles are the selected control rods. The control rods added with numerals are used to be inserted into core 2, and the numerals designate the number of notches representing the quantity of the insertion of the control rods into the core. As shown in FIG. 8, when the selected control rods are selected from the control rods located at the outermost periphery, a fine power control can be advantageously done and the variation of the power can be suppressed when the control rods are withdrawn from the core since the control rods at the outermost periphery has low value of reactivity per one unit. On the contrary, when the selected control rods are selected from the control rods located at the center as shown in FIG. 6, a relatively large power variation can be provided merely by inserting a small number of control rods.

In this embodiment, the power of atomic reactor status monitoring circuit 22 is used as the signal $P_0$ for operating power control circuit 21, but a steam output of atomic reactor may also be used therefor.

The foregoing description is directed to an atomic reactor which has externally a recirculation pump, but an atomic reactor which has internally a recirculation pump can also be readily and accurately controlled in the same manner as above by controlling the quantity of insertion of selected control rods and the control of the number of tripped internal pumps.

We claim:

1. A power control apparatus for a boiling water atomic reactor which is provided for a nuclear power plant having a boiling-water reactor with a core, a pressure vessel; an electric generator; a turbine driven by steam produced in the pressure vessel to cause the electric generator to be driven; a condenser to which the steam which has driven said turbine is conducted; a load rejection detector connected to said electric generator; and a bypass valve responsive to said load rejection detector to bypass the steam from said pressure vessel to the condenser when a load rejection occurs, in which at a time of load rejection the boiling water reactor is operated at a lower power level, said power control appartus comprising:

pump means for recirculating a coolant in said pressure vessel;

control rod inserting means for inserting control rods into the core;

reactor status monitoring means for detecting a power output level and a coolant flow rate in the core; and control means responsive to said load rejection detector to generate a signal based on a power output level $P_0$ and core flow rate $W_0$ in the core at the time of load rejection, said signal being used for controlling whether or not the control rod should be inserted into the core, in which when said signal is greater than a predetermined value said control means permits selected control rods to be inserted into the core through said control rod inserting means and at the same time said control means permits the recirculating pump means to be operated in a minimum coolant flow rate and when said signal is less than said predetermined value said control means permits the recirculating pump means to be operated in said minimum coolant flow rate without inserting any control rods.

2. A power control apparatus according to claim 1, further comprising:

means for generating said signal for control with the relationship of $P_0-aW_0$ where a denotes a constant.

3. A power control apparatus according to claim 1, further comprising: means for generating said signal for control in accordance with the relationship of $P_0-aW_0$ where a denotes a constant; and control rod inserting means for inserting selected control rods when said signal is greater than said predetermined value, wherein the number of selected control rods which are to be inserted into the core are increased in a stepwise fashion according to said predetermined value.

4. A power control apparatus according to claim 1, further comprising: means for arranging said control means so that it permits said recirculating pump means to be operated in said minimum coolant flow rate after a lapse of a predetermined time taken from the quick opening of said bypass value due to the load rejection until a power output level in the core is set.

5. A power control apparatus according to claim 1, further comprising: additional control means for controlling at a point of time at which the power output level in the core approaches set power output level after said bypass valve has been quickly opened due to the load rejection, insertion of an additional control rod into the core through said control rod inserting means when said set power output level is relatively high.

* * * * *